United States Patent
Jung et al.

(10) Patent No.: US 8,335,181 B2
(45) Date of Patent: Dec. 18, 2012

(54) METHOD OF RELEASING AN ACCESS RESTRICTION AT HIGH INTERFERENCE CELL IN A WIRELESS COMMUNICATION SYSTEM

(75) Inventors: Sung-Hoon Jung, Gyeonggi-Do (KR); Sung-Duck Chun, Gyeonggi-Do (KR); Seung-June Yi, Gyeonggi-Do (KR); Young-Dae Lee, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 12/764,668

(22) Filed: Apr. 21, 2010

(65) Prior Publication Data
US 2010/0272086 A1    Oct. 28, 2010

Related U.S. Application Data

(60) Provisional application No. 61/171,818, filed on Apr. 22, 2009.

(30) Foreign Application Priority Data

Apr. 1, 2010   (KR) .................. 10-2010-0030123

(51) Int. Cl.
*H04W 4/00* (2009.01)

(52) U.S. Cl. .................................................. 370/328
(58) Field of Classification Search .................. 370/317, 370/318, 328, 329
See application file for complete search history.

(56) References Cited

U.S. PATENT DOCUMENTS

2009/0268671 A1* 10/2009 Cave et al. ............. 370/328
2010/0118801 A1*  5/2010 Yavuz et al. ............ 370/329

* cited by examiner

*Primary Examiner* — Kwang B Yao
*Assistant Examiner* — Tung Q Tran
(74) *Attorney, Agent, or Firm* — McKenna Long & Aldridge LLP

(57) ABSTRACT

The present invention relates to a wireless communication system and UE providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system, or a LTE-A (LTE-Advanced) system, and more particularly, to a method of releasing an access restriction at high interference cell, such that an effect of the interference can be minimized.

11 Claims, 12 Drawing Sheets

METHOD OF RELEASING AN ACCESS RESTRICTION AT HIGH INTERFERENCE CELL IN A WIRELESS COMMUNICATION SYSTEM

CROSS-REFERENCE

The present application claims priority benefit to the following applications, which contents are all incorporated by reference herein: U.S. Provisional Application No. 61/171,818 filed on Apr. 22, 2009 and Korean Patent Application No. 10-2010-0030123 filed on Apr. 1, 2010.

BACKGROUND OF THE INVENTION

1. Field of the Invention

The present invention relates to a wireless communication system and user equipment providing wireless communication services, and a method of determining the operation mode of a base station, that is, the connection mode (access mode) of a cell, based on which user equipment's connection is allowed by a base station in an evolved Universal Mobile Telecommunications System (UMTS) that has evolved from a Universal Mobile Telecommunications System (UMTS), a Long Term Evolution (LTE) system, or a LTE-A (LTE-Advanced) system and more particularly, to a method of releasing an access restriction at high interference cell.

2. Description of the Related Art

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an Si interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Interconnection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has a time duration of 0.5 ms. A Transmission Time Interval (TTI) as a unit time for transmitting data is 1 ms, corresponding to two sub-frames.

Hereinafter, an RRC state and an RRC connection method of UE will be described in detail. The RRC state refers to whether or not the RRC of the UE is logically connected to the RRC of an E-UTRAN. If connected, then it is called an RRC_CONNECTED state, and otherwise it is called an TTC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the RRC of the E-UTRAN through an RRC connection procedure when it is required to make an RRC connection, thereby changing the state to an RRC_CONNECTED state. There are several cases when the UE in an idle state is required to make an RRC connection. For example, an uplink data transmission may be required due to a phone call attempt by the user, or the like, or the transmission of a response message may be required in response to a paging message received from the E-UTRAN.

The Non-Access Stratum (NAS) layer located at an upper level of the RRC performs a function such as session management, mobility management, and the like.

In order to manage the mobility of the UE at the NAS layer, both an EPS Mobility Management-REGISTERED (EMM-REGISTERED) state and an EMM-DEREGISTERED state are defined, and both states will be applied to the UE and a Mobility Management Entity (MME). The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an 51 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

Next, system information will be described. The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

The system information can be divided into MIB, SB, SIB, and the like. The Master Information Block (MIB) allows the UE to be notified of a physical architecture of the corresponding cell, for example, a bandwidth, and the like. The Scheduling Block (SB) notifies of the transmission information of SIBs, for example, transmission period, and the like. The System Information Block (SIB) is a set of mutually-related system information. For example, a certain SIB includes only the information of neighboring cells, and another certain SIB includes only the information of uplink radio channels used by the UE.

In the related art, if a cell selected by a terminal restricts an access of the terminal and the terminal camps on such cell, this causes a interference between the terminal and a base station. Therefore, due to this interference, there is a great drawback that the a quality of signals between the terminal and the base station is degraded.

SUMMARY OF THE INVENTION

Accordingly, an object of the present invention is to provide an improved method for minimizing an effect of the interference between a terminal and a base station.

In order to solve the foregoing problem, a method of accessing a cell in wireless communication system according to the present invention is characterized by including the steps of receiving access information from a network; determining whether an access to the cell is restricted based on a first parameter included in the received access information; if the access to the cell is determined to be restricted, determining whether the access to the cell is allowed at a high interference based on a second parameter included in the received access information; if the access to the cell is determined to be allowed at the high interference, estimating an interference; and selectively releasing the restricted access to the cell according to the estimated interference.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
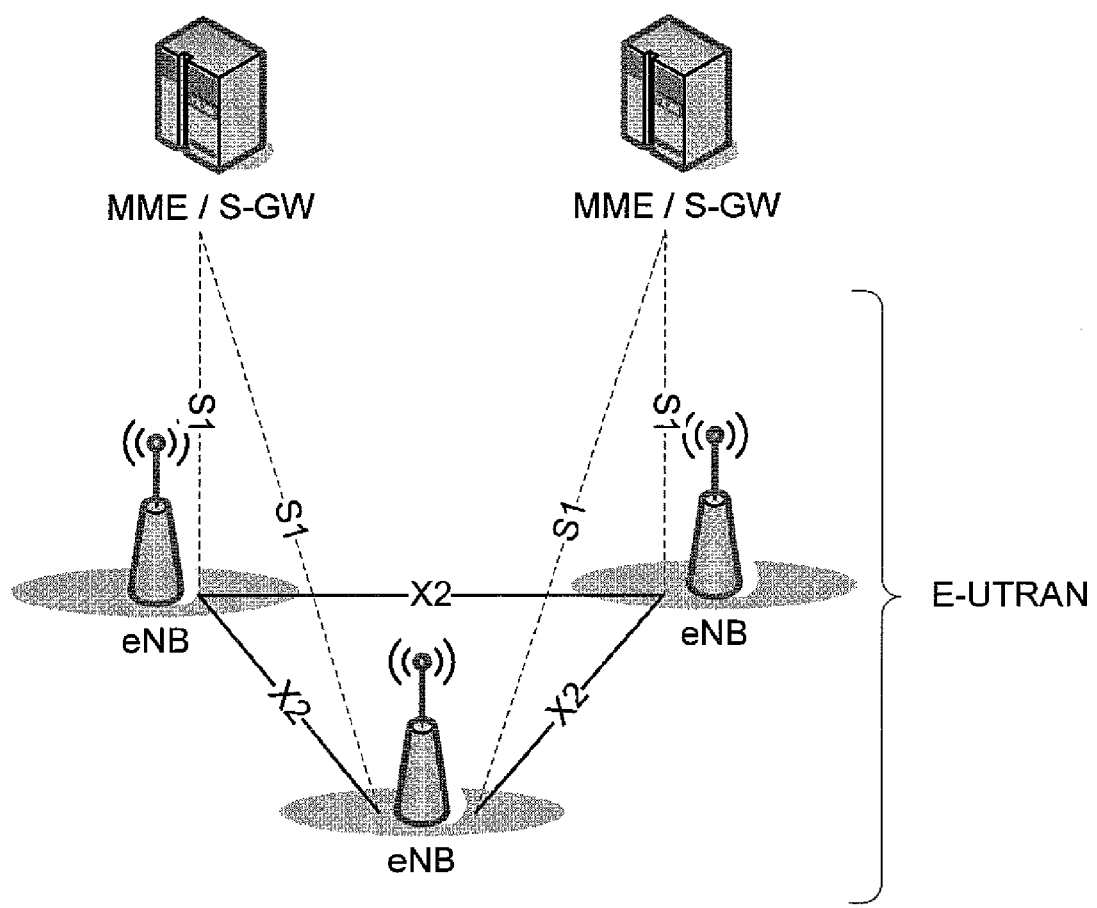
FIG. 1 is a view illustrating a network architecture of E-UTRAN, which is a mobile communication system to which the related art and the present invention are applied.
Figure 2:
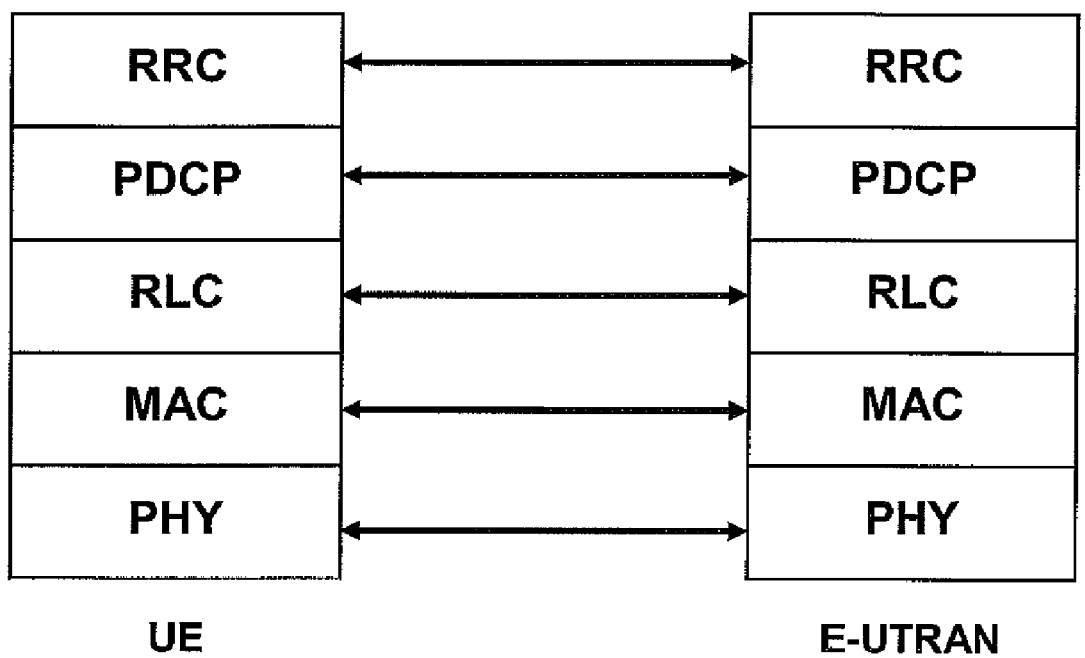
FIG. 2 is an exemplary view illustrating a control plane architecture in a radio interface protocol between UE and E-UTRAN in the related art.
Figure 3:
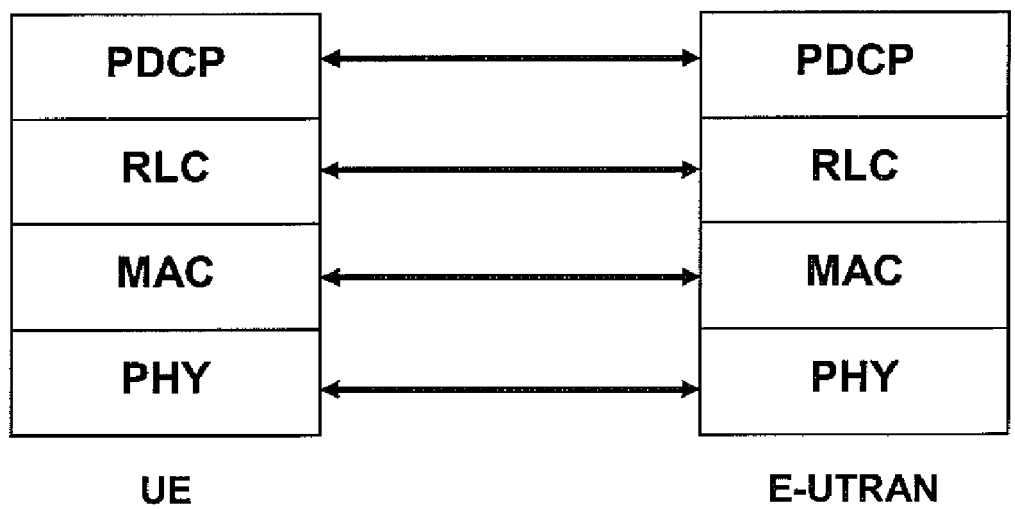
FIG. 3 is an exemplary view illustrating a user plane architecture in a radio interface protocol between UE and E-UTRAN in the related art.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

According to a basic concept of the present invention, there is proposed a method of releasing an access restriction at high interference cell in order to minimize an effect of the interference between a terminal and a base station.

Hereinafter, the configuration and operation of preferred embodiments according to the present invention will be described with reference to the accompanying drawings.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Figure 4:
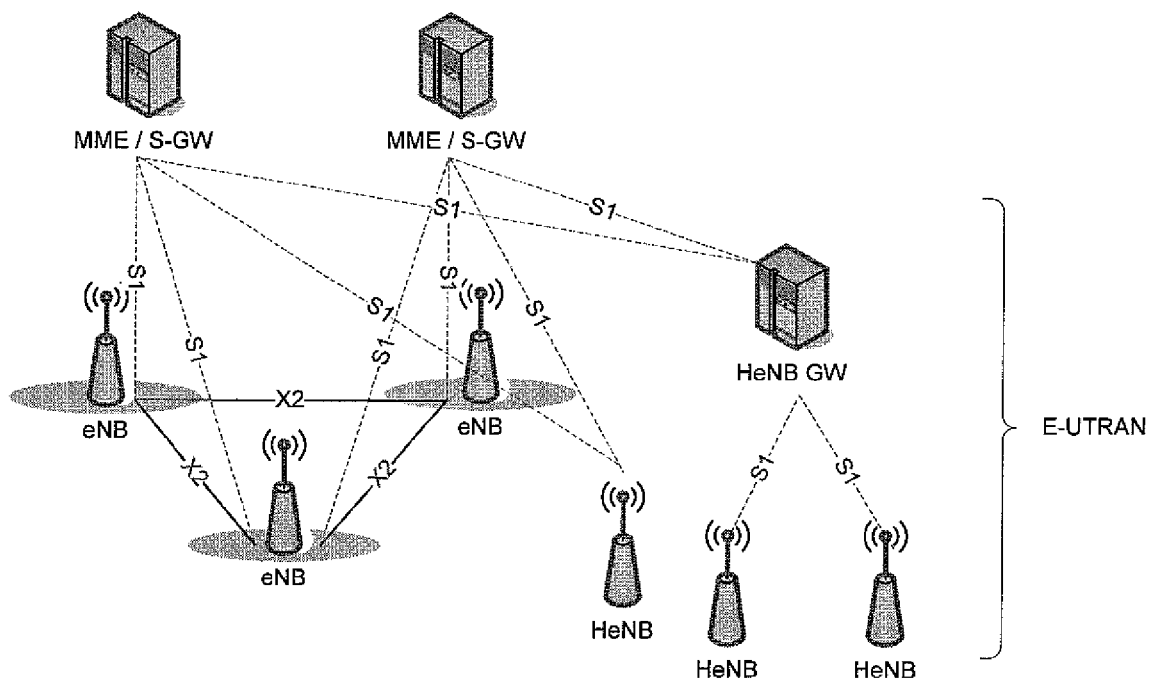
FIG. 4 is an exemplary view illustrating a network architecture of E-UTRAN for managing H(e)NB by using an H(e)NB gateway (GW)

FIG. 4 is an exemplary view illustrating a network architecture of E-UTRAN for managing an H(e)NB by using an H(e)NB gateway (GW).

As illustrated in FIG. 4, HeNBs may be connected to EPC via HeNB GW or directly connected to EPC. Here, the HeNB GW is regarded as a typical eNB to MME. Also, the HeNB GW is regarded as the MME to the HeNB. Therefore, an Si interface is connected between HeNB and HeNB GW, and also an Si interface is connected between the HeNB GW and the EPC. Furthermore, even in case of directly connecting between HeNB and EPC, it is connected via an Si interface. The function of HeNB is almost similar to the function of a typical eNB.

In general, H(e)NB has a low radio transmission output power compared to (e)NB owned by mobile communication service providers. Therefore, the service coverage provided by H(e)NB is typically smaller than the service coverage provided by (e)NB. Due to such characteristics, the cell provided by H(e)NB is classified as a femto cell in contrast to a macro cell provided by (e)NB from a standpoint of the service coverage. On the other hand, from a standpoint of provided services, when H(e)NB provides those services only to a CSG group, the cell provided by this H(e)NB is referred to as a CSG cell.

Each CSG has its own identification number, and this identification number is called a CSG ID (CSG identity). The UE may have a CSG list to which the UE itself belongs as a member thereof, and this CSG list may be changed by a request of the UE or a command of the network. Typically, one H(e)NB may support one CSG.

H(e)NB delivers the CSG ID of the CSG being supported by itself through the system information, thereby allowing only the corresponding CSG member UE to be accessed. When a CSG cell is found by the UE, what type of CSG being supported by this CSG cell can be checked by reading the CSG ID included in the system information. The UE that has read the CSG ID regards the corresponding cell as an accessible cell only if the UE itself is a member of the corresponding CSG cell.

It is not always required for H(e)NB to allow only the CSG UE to be accessed. Based on the configuration setting of H(e)NB, non-CSG member UE may be allowed to be accessed. The type of UE allowed to be accessed may be changed based on the configuration setting of H(e)NB. Here, the configuration setting denotes the setting of the operation mode of H(e)NB. The operation mode of H(e)NB can be divided into three types as follows based on the type of UE.

1) Closed access mode: A mode in which services are provided to particular CSG members only. A CSG cell is provided by H(e)NB.

2) Open access mode: A mode in which services are provided without any restriction of particular CSG members like typical (e)NB.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

H(e)NB notifies the UE that the cell being serviced by itself is a CSG cell or typical cell, allowing the UE to know whether or not it can be accessed to the corresponding cell. H(e)NB being managed in a closed access mode broadcasts via the system information that it is a CSG cell. In this manner, H(e)NB allows the system information to include an one-bit CSG indicator indicating whether or not the cell being serviced by itself is a CSG cell in the system information. For example, the CSG cell broadcasts by setting the CSG indicator to TRUE. If the cell being serviced is not a CSG cell, then it may be used a method that the CSG indicator may be set to FALSE or the transmission of the CSG indicator is omitted. The UE should distinguish a typical cell provided by (e)NB from a CSG cell, and thus a typical (e)NB may also transmit the CSG indicator (for example, FALSE), thereby allowing the UE to know that the cell type provided by itself is a typical cell. Furthermore, the typical (e)NB may not transmit the CSG indicator, thereby allowing the UE to know that the cell type provided by itself is a typical cell, too. The CSG-related parameters transmitted by the corresponding cell for each cell type are represented in Table 1. Subsequently, the types of UE allowed to be accessed for each cell type are represented in Table 2.

TABLE 1

CSG-related parameters included in the system information for each cell type

| | CSG Cell | Typical Cell |
| --- | --- | --- |
| CSG Indicator | 'CSG Cell' is indicated | 'Non-CSG cell' is indicated, or not transmitted |
| CSG Identity | Supported CSG identity is transmitted | Not transmitted |

TABLE 2

Type of UE allowed to be accessed for each cell type

| | CSG Cell | Typical Cell |
| --- | --- | --- |
| UE not supporting CSG | Access disabled | Access enabled |
| Non-CSG member UE | Access disabled | Access enabled |
| CSG member UE | Access enabled | Access enabled |

Figure 5:
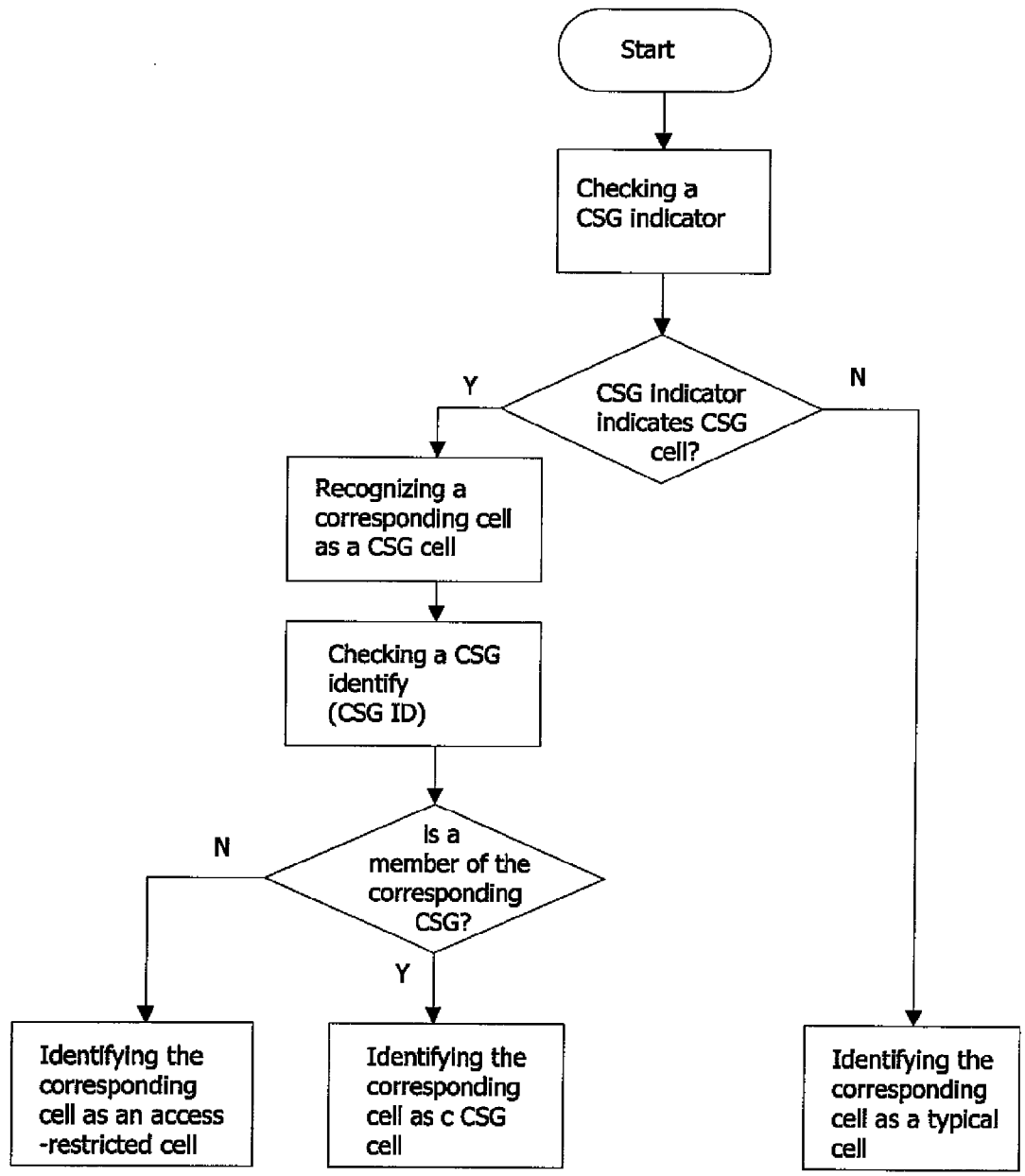
FIG. 5 is an exemplary view illustrating a method of checking the access mode of a base station by the UE according to the present invention.
Figure 6:
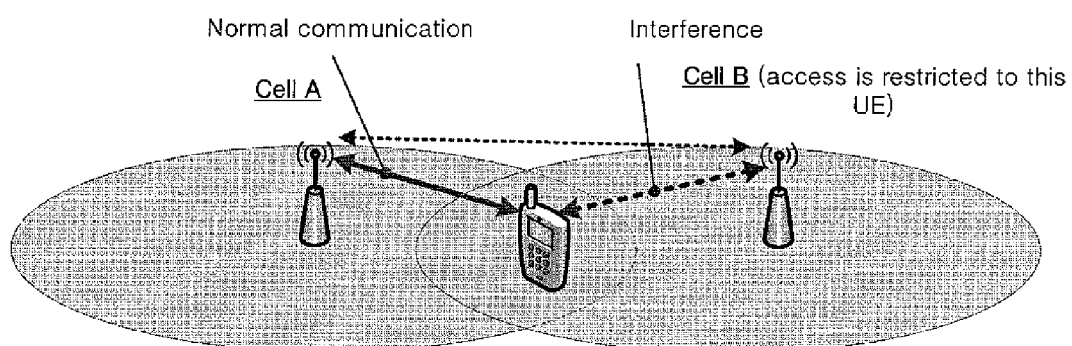
FIG. 6 is an exemplary view illustrating an effect of the interference between a terminal and a base station.

FIG. 5 is a first exemplary view illustrating a method of checking the access mode of a base station by the UE according to the present invention.

In the first step, the UE first checks the CSG indicator in the system information of the object cell in order to check the type of the object cell. After checking the CSG indicator, and then in the second step, if the CSG indicator indicates that the object cell is a CSG cell, then the UE recognizes the corresponding cell as a CSG cell. Subsequently, the UE checks the CSG identity or CSG identifier in the system information in order to check whether or not the UE itself is a CSG member of the object cell. If it is checked from the CSG identity that the UE is a CSG member of the object cell, then the corresponding cell will be recognized as an accessible CSG cell.

If it is checked from the CSG identity that the UE is not a CSG member of the object cell, then the corresponding cell will be recognized as an inaccessible CSG cell. If the CSG indicator indicates that the object cell is not a CSG cell in the first step, then the UE recognizes the object cell as a typical cell. Furthermore, if the CSG indicator is not transmitted in the first step, the UE recognizes the object cell as a typical cell.

In general, CSG cells and macro cells may be concurrently managed at a particular frequency. This frequency is called a mixed carrier frequency. The network may reserve particular physical layer CSG identities in a mixed carrier frequency for CSG cells. The physical layer CSG identity is called a Physical Cell Identity (PCI) in E-UTRAN, and called a Physical Scrambling Code (PSC) in UTRAN. For the sake of convenience of explanation, the physical layer CSG identity will be expressed by PCI. In a mixed carrier frequency, the CSG cell notifies information on the PCIs reserved for CSG at a current frequency via the system information. The UE received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process. In this case, the UE checks only the PCI of the cell, and then the UE may immediately eliminate the corresponding cell during the cell selection/reselection process if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

As described above, when H(e)NB operates by using either one of two methods, open access mode or closed access mode, it is enough to broadcast one-bit CSG indicator by H(e)NB in order to distinguish those two mode from each other. Also in case of a typical (e)NB, the UE determines whether the corresponding cell is a CSG cell or typical cell via a CSG indicator being transmitted from the base station.

A detail description of an interference between a terminal and a base station (e.g., eNB) will be given as following.

Figure 7:
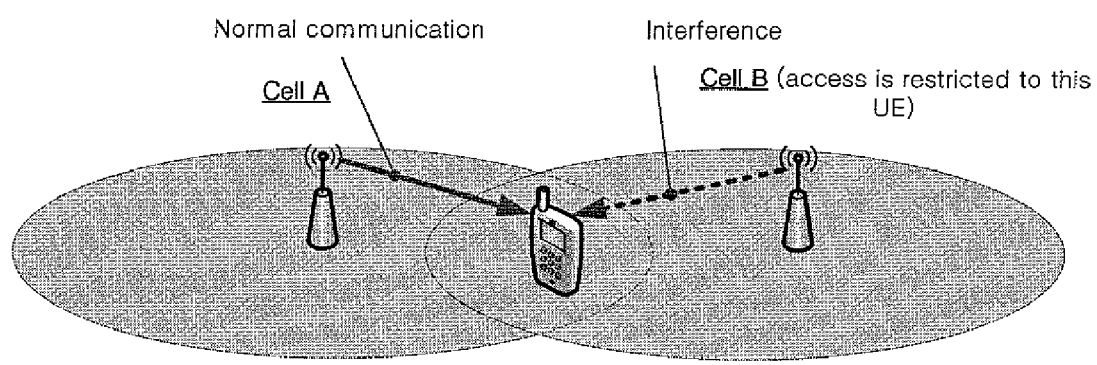
FIG. 7 is an exemplary view illustrating a downlink interference by an access restricted cell.
Figure 8:
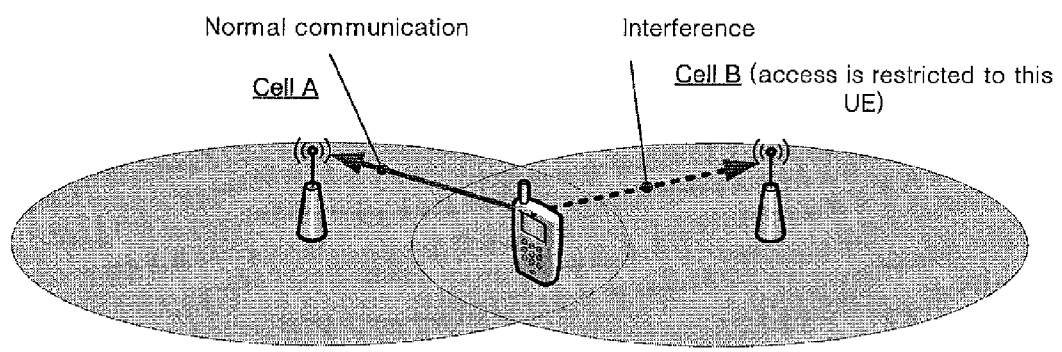
FIG. 8 is an exemplary view illustrating a uplink interference by a terminal camping on the access restricted cell.

FIG. 7 is an exemplary view illustrating a downlink interference by an access restricted cell and FIG. 8 is an exemplary view illustrating a uplink interference by a terminal camping on the access restricted cell.

As shown in the FIG. 7 and the FIG. 8, since a cell B is a restricted cell to a terminal, this may cause a great amount of interference between the terminal and the base station of the cell B in both uplink and downlink direction.

Figure 9:
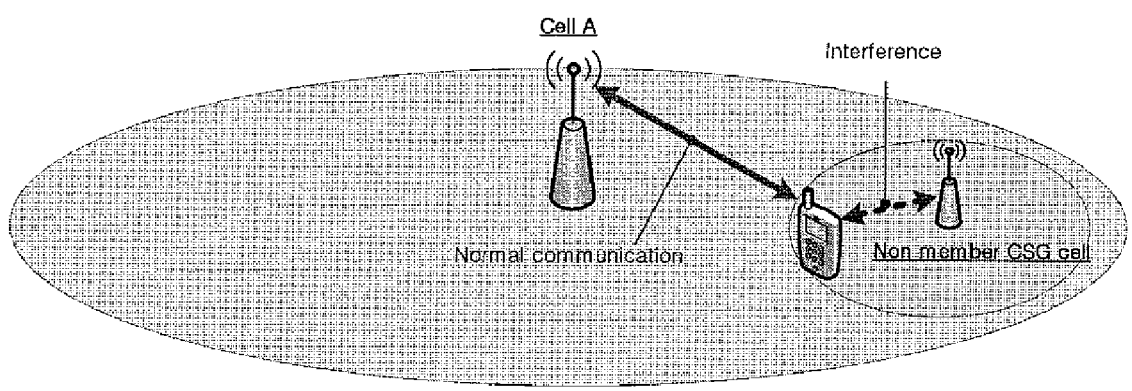
FIG. 9 is an exemplary view illustrating an interference between a non-CSG member terminal and a CSG (Closed Subscriber Group) cell.

FIG. 9 is an exemplary view illustrating an interference between a non-CSG member terminal and a CSG (Closed Subscriber Group) cell.

As shown in the FIG. 9, a terminal can not access to a CSG cell since the terminal is not a member of the CSG cell. Therefore, although the CSG cell is a nearest cell to the terminal, the terminal has to make a connection with a cell A. In this case, since the cell A is far away from the terminal, the terminal must transmit a signal with a high power. And, the signal with the high power from the terminal may create an interference to the CSG cell. The terminal also continuously receives the interference by the CSG cell while the terminal is camping on the CSG cell.

As such, the present invention may propose a method of releasing an access restriction at high interference cell only if a base station allows it.

Figure 10:
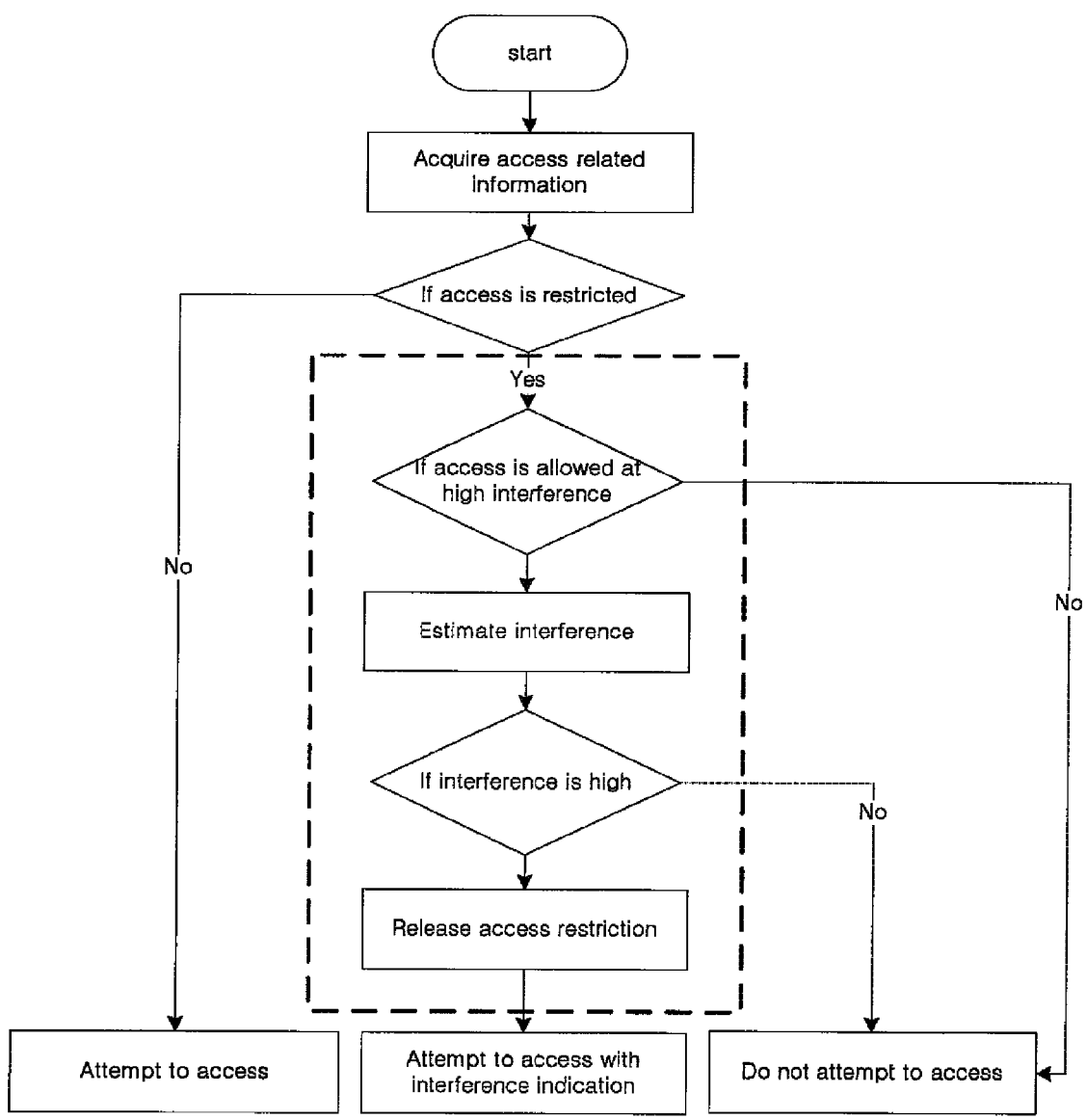
FIG. 10 is an exemplary view illustrating an access operation procedure of the terminal according to the present invention.

FIG. 10 is an exemplary view illustrating an access operation procedure of the terminal according to the present invention.

As shown in the FIG. 10, firstly, a terminal may obtain access related information from a base station (i.e., eNB). Then, based on the received access related information, the terminal may determine that whether an access to the cell (i.e., a cell managed by the base station) is restricted or not. If it is determined that the access to the cell is restricted, then the terminal may determine that whether the base station allows an access of the terminal (i.e., non-member terminal) creating a high interference. If such access of the terminal is allowed by the base station, the terminal may estimate the interference. Here, if it is determined that the estimated interference is high, the terminal may attempt to release an access restriction. If it is determined that the estimated interference is not high, the terminal does not attempt to access to the base station. Thereafter, the above procedure can be performed repeatedly. Further, in order to reduce the interference, a priority of frequency may be randomly changed (e.g., setting a priority of other frequency higher than a priority of current frequency, or setting the priority of current frequency lower than the priority of other frequency). By changing the priority of frequency, the terminal may be temporarily moved into different frequency thereby minimizing the interference. During the above procedure, if the terminal attempts to access the cell by releasing the access restriction, the terminal may indicate the base station that there is the high interference between the terminal and the base station. (e.g. transmitting an interference indication)

The following is exemplary embodiments illustrating how the interference is estimated by the terminal.

Figure 11:
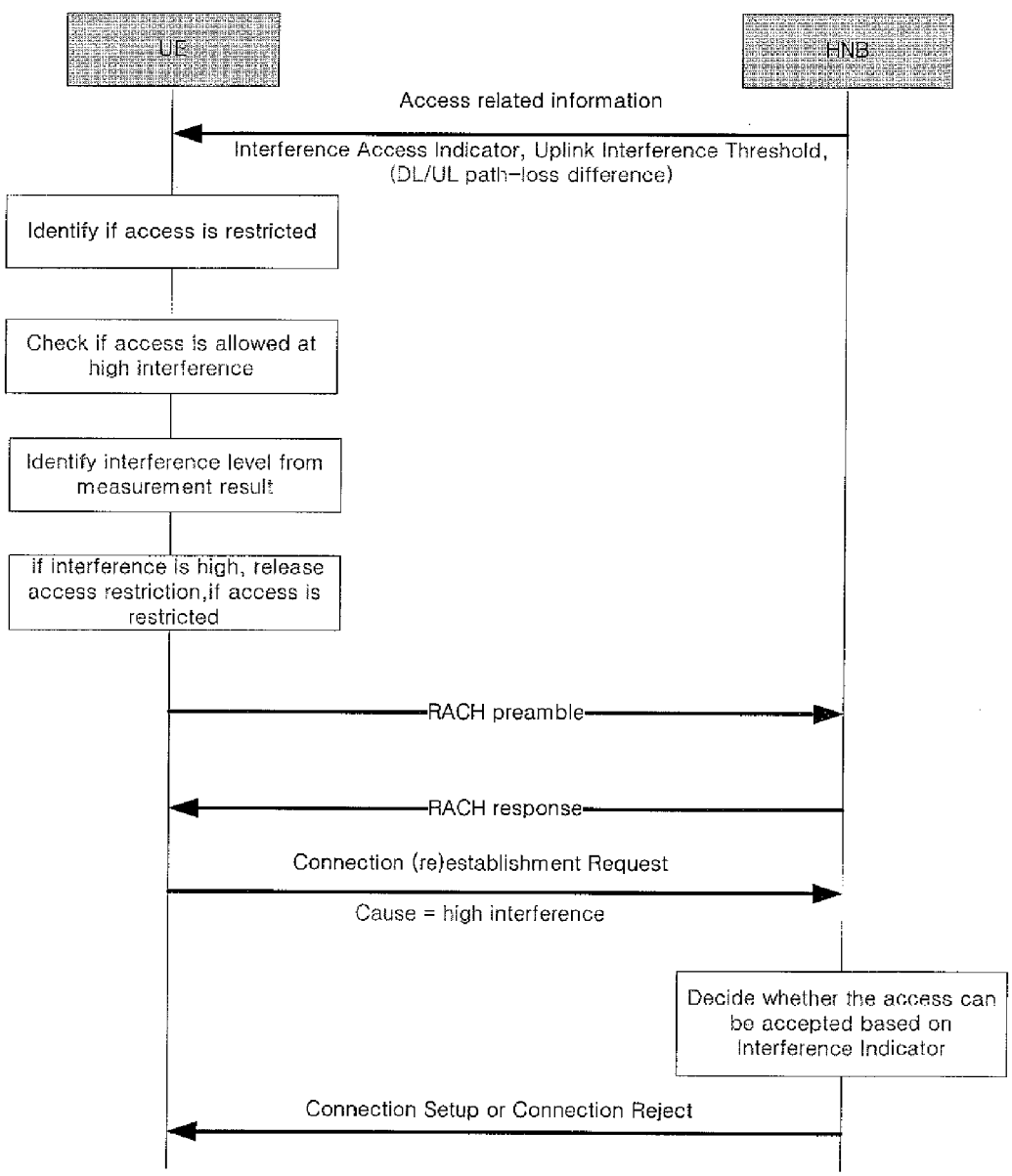
FIG. 11 is a first exemplary view illustrating a method of releasing an access restriction at a high interference cell.

As for a first exemplary, the present invention may propose a method of estimating an uplink interference amount based on a terminal's downlink quality. FIG. 11 is a first exemplary view illustrating a method of releasing an access restriction at a high interference cell.

As shown in the FIG. 11, a base station (i.e., eNB, HNB) may broadcast access related information to a terminal. Here, an interference access indicator and an interference threshold may be also broadcasted to the terminal together with the access related information. Here, the interference access indicator and the interference threshold may be broadcasted to the terminal separately. The interference access indicator may be used to indicate that the base station allows the terminal to release an access restriction according to an interference level. The interference threshold may be used as a reference value indicating an interference level that allows the terminal to release the access restriction. In general, the interference access indicator and the interference threshold may be transmitted to the terminal in a cell specific signaling. However, the interference access indicator and the interference threshold may also be transmitted to the terminal in a UE specific signaling (e.g., a cell re-selection parameter, etc). After receiving the access related information from the base station, the terminal may determine that whether an access to the cell is restricted or not. If it is determined that the access to the cell (or base station) is restricted, the terminal may check if the access to the cell is allowed at a high interference. Here, if the terminal receives the interference access indictor or the interference threshold, the base station (or a cell) is regarded as a base station that allows a releasing of the access restriction at the high interference. If the access to the cell at the high interference is allowed by the base station, the terminal may estimate or identify an interference level based on a measurement result of a transmitting signal from the base station. Here, the terminal may estimate a downlink quality of the base station by measuring a reference signal transmitting by the base station. Based on the downlink quality, the terminal may estimate a downlink interference applied into the terminal by the base station. Namely, if the measured downlink quality with respect to a particular base station is high (or good), the downlink interference applied into the terminal by the particular base station is also high (or large). Further, an uplink quality may be appropriately estimated based on the measured downlink quality. That is, if the base station notifies a channel quality gap between the uplink and downlink via broadcast information, the terminal may estimate the uplink quality by utilizing this channel quality gap. In case that such channel quality gap is not provided to the terminal, the terminal may assume that the uplink quality is same as the downlink quality. Here, if the estimated uplink quality with respect to a particular base station is high (or good), the uplink interference applied into the particular base station by the terminal is also high (or large). During the step of estimating the interference between the base station and the terminal, an amount of downlink interference may be only considered. In some other cases, an amount of uplink interference or an amount of both downlink and uplink interference may be considered. In general, the amount of uplink interference is mainly considered as the uplink inference applied into the particular base station by the terminal has a great effect in most of communication system. During the above procedure, if an amount of the estimated interference is greater (or larger) than the interference threshold received from the base station, the terminal may release the access restriction and may attempt to access to the base station (or cell). If the amount of the estimated interference is less (or smaller) than the interference threshold transmitted from the base station, the terminal does not attempt to access to the cell. During the terminal attempts to access to the cell or after the terminal is accessed to the cell, the terminal may notify a access cause to the base station. (i.e., the terminal causes a high uplink interference) In order to notify this to the base station, when the terminal transmits a RRC connection setup request message or a RRC connection setup complete message to the base station, one bit of the interference indicator may be included in these messages. Or, a cause field of the RRC connection setup request message may be created and may be set as 'a high interference'. Here, the cause field for the high interference is a newly introduced field in the RRC connection setup request message. By utilizing the interference indicator during the above access procedure, if the base station recognizes that the access restriction to the cell by the terminal would create the high interference, the base station may allow the access of the terminal. After allowing the access of the terminal, by performing a mobility procedure such as an additional handover procedure, the base station may instruct the terminal to move into different frequency such that the interference can be minimized.

Figure 12:
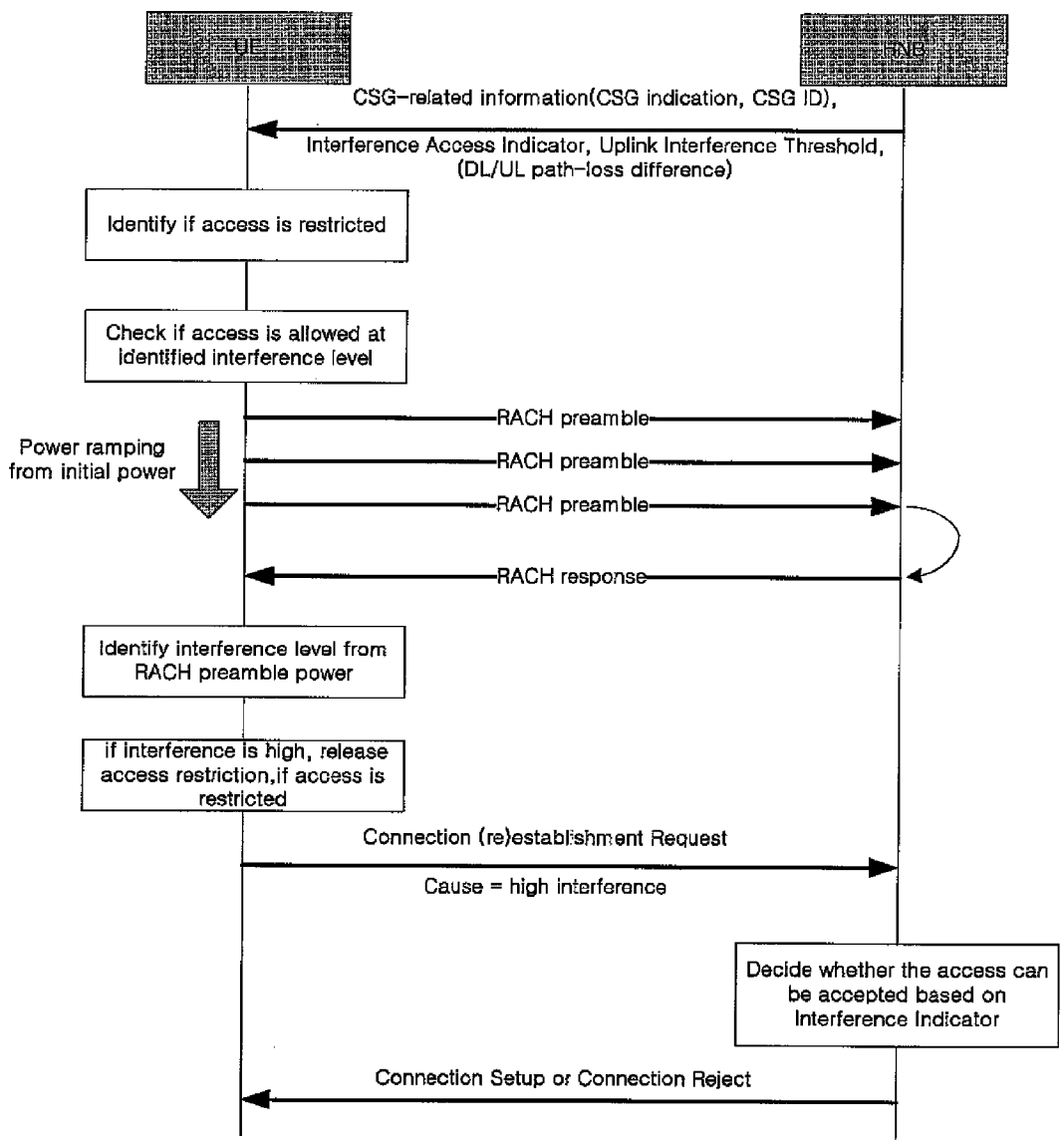
FIG. 12 is a second exemplary view illustrating the method of releasing the access restriction at the high interference cell.

As for a second exemplary, the present invention may propose a method of estimating an uplink interference amount based on a transmission power of a random access preamble used in an access procedure. FIG. 12 is a second exemplary view illustrating a method of releasing an access restriction at the high interference cell.

As shown in the FIG. 12, a base station (i.e., eNB, HNB) may broadcast access related information to a terminal. Here, an interference access indicator and an interference threshold may be also broadcasted to the terminal together with the access related information. Here, the interference access indicator and the interference threshold may be broadcasted to the terminal separately. The interference access indicator may be used to indicate that the base station allows the terminal to release an access restriction according to an interference level. The interference threshold may be used as a reference value indicating an interference level that allows the terminal to release the access restriction. In general, the interference access indicator and the interference threshold may be transmitted to the terminal in a cell specific signaling. However, the interference access indicator and the interference threshold may also be transmitted to the terminal in a UE specific signaling (e.g., a cell re-selection parameter, etc). After receiving the access related information from the base station, the terminal may determine that whether an access to the cell is restricted or not. If it is determined that the access to the cell (or base station) is restricted, the terminal may check if the access to the cell is allowed at a high interference. Here, if the terminal receives the interference access indictor or the interference threshold, the base station (or a cell) is regarded as a base station that allows a releasing of the access restriction at the high interference. If the access to the cell at the high interference is allowed by the base station, the terminal may perform a random access procedure in order to start an access connection procedure. Here, the terminal may estimate an uplink quality based on a lastly transmitted RACH preamble power before receiving of a RACH response. Here, an uplink interference has an inverse relationship with the uplink quality. Namely, if the last transmitted RACH preamble power is greater (or larger) than the interference threshold value received from the base station, the terminal may release the access restriction and may attempt to access to the base station (or cell). If the amount of the estimated interference is less (or smaller) than the interference threshold transmitted from the base station, the terminal does not attempt to access to the cell. During the terminal attempts to access to the cell or after the terminal is accessed to the cell, the terminal may notify a access cause to the base station. (i.e., the terminal causes a high uplink interference) In order to notify this to the base station, when the terminal transmits a RRC connection setup request message or a RRC connection setup complete message to the base station, one bit of the interference indicator may be included in these messages. Or, a cause field of the RRC connection setup request message may be created and may be set as 'a high interference'. Here, the cause field for the high interference is a newly introduced field in the RRC connection setup request message. By utilizing the interference indicator during the above access procedure, if the base station recognizes that the access restriction to the cell by the terminal would create the high interference, the base station may allow the access of the terminal. After allowing the access of the terminal, by performing a mobility procedure such as an additional handover procedure, the base station may instruct the terminal to move into different frequency such that the interference can be minimized.

In above examples, the RRC connection procedure has been applied to the present invention. However, the RRC connection reestablishment procedure may also be applied by the present invention. Further, a concept of the present invention may be applied in other communication system such as a LTE-A system. Further, according to the present invention, an access of a non-member CSG terminal to the CSG cell is possible in a emergency situation.

The present disclosure may provide a method of accessing a cell in wireless communication system, the method comprising: receiving access information from a network; determining whether an access to the cell is restricted based on a first parameter included in the received access information; if the access to the cell is determined to be restricted, determining whether the access to the cell is allowed at a high interference based on a second parameter included in the received access information; if the access to the cell is determined to be allowed at the high interference, estimating an interference; and selectively releasing the restricted access to the cell according to the estimated interference, wherein the access information is interference related access control information, the first parameter of the access information is an interference access indicator and the second parameter of the access information is an interference threshold, the network is a Home NodeB (HNB) or a Macro NodeB, the first and second parameters of the access information is received via a cell specific signaling or a UE specific signaling, the interference is estimated by using a reference signal in a downlink direction, an amount of the interference is related with a quality of the reference signal, the interference is estimated by using a power of a lastly transmitted RACH (Random Access Channel) preamble in an uplink direction, an amount of the interference has an inverse relationship with the power of the lastly transmitted RACH preamble, the restricted access to the cell is released if the estimated interference is greater than or equal to the interference threshold included in the access information, and the restricted access to the cell is not released if the estimated interference is less than the interference threshold included in the access information.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of accessing a cell in wireless communication system, the method comprising:
   receiving access information from a network;
   determining whether an access to the cell is restricted based on a first parameter included in the received access information;
   if the access to the cell is determined to be restricted, determining whether the access to the cell is allowed at a high interference based on a second parameter included in the received access information;
   if the access to the cell is determined to be allowed at the high interference, estimating an interference; and
   selectively releasing the restricted access to the cell according to the estimated interference.

2. The method of claim 1, wherein the access information is interference related access control information.

3. The method of claim 1, wherein the first parameter of the access information is an interference access indicator and the second parameter of the access information is an interference threshold.

4. The method of claim 1, wherein the network is a Home NodeB (HNB) or a Macro NodeB.

5. The method of claim 3, wherein the first and second parameters of the access information is received via a cell specific signaling or a UE specific signaling.

6. The method of claim 1, wherein the interference is estimated by using a reference signal in a downlink direction.

7. The method of claim 6, wherein an amount of the interference is related with a quality of the reference signal.

8. The method of claim 1, wherein the interference is estimated by using a power of a lastly transmitted RACH (Random Access Channel) preamble in an uplink direction.

9. The method of claim 8, wherein an amount of the interference has an inverse relationship with the power of the lastly transmitted RACH preamble.

10. The method of claim 3, wherein the restricted access to the cell is released if the estimated interference is greater than or equal to the interference threshold included in the access information.

11. The method of claim 3, wherein the restricted access to the cell is not released if the estimated interference is less than the interference threshold included in the access information.

* * * * *